(12) United States Patent
Amend et al.

(10) Patent No.: US 12,199,857 B2
(45) Date of Patent: Jan. 14, 2025

(54) TECHNIQUES FOR DETECTING BURSTY TRAFFIC PATTERN DETECTION AND SCHEDULING MULTIPATH DATA TRAFFIC

(71) Applicant: Deutsche Telekom AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 342 days.

(21) Appl. No.: 17/641,451

(22) PCT Filed: Sep. 15, 2020

(86) PCT No.: PCT/EP2020/075755
§ 371 (c)(1),
(2) Date: Mar. 9, 2022

(87) PCT Pub. No.: WO2021/052953
PCT Pub. Date: Mar. 25, 2021

(65) Prior Publication Data
US 2022/0393968 A1   Dec. 8, 2022

(30) Foreign Application Priority Data
Sep. 17, 2019 (EP) .................... 19197770

(51) Int. Cl.
*H04L 45/24* (2022.01)
*H04L 43/0876* (2022.01)
*H04L 45/00* (2022.01)

(52) U.S. Cl.
CPC .......... *H04L 45/24* (2013.01); *H04L 43/0876* (2013.01); *H04L 45/70* (2013.01)

(58) Field of Classification Search
CPC ...... H04L 45/24; H04L 43/0876; H04L 45/70
See application file for complete search history.

(56) References Cited

U.S. PATENT DOCUMENTS 8,036,226 B1   10/2011   Ma et al.
10,225,275 B1   3/2019   Xu et al.
(Continued)

FOREIGN PATENT DOCUMENTS

| CN | 1610286 A | 4/2005 |
| CN | 103987056 A | 8/2014 |

(Continued)

OTHER PUBLICATIONS

Roman Krzanowski: "Burst (of packets) and Burstiness", Oct. 7, 2006 (Oct. 7, 2006), XP055446565, 66th IETF—Montreal, Quebec, Canada Retrieved from the Internet: URL:https://www.ietf.org/proceedings/66/slides/ippm-10.pdf [retrieved on Jan. 31, 2018] the whole document.

*Primary Examiner* — Duc C Ho
(74) *Attorney, Agent, or Firm* — LEYDIG, VOIT & MAYER, LTD.

(57) ABSTRACT

A data traffic analyzer is configured for detecting bursty data traffic on a data path. The data traffic analyzer measures data traffic parameters of the data path and analyzes the data traffic parameters of the data path to detect a bursty traffic pattern based on comparing the data traffic parameters to a time interval threshold $T_{Limit}$ which defines gaps between bursty data traffic. The measured traffic parameters include: i) a data traffic volume and/or a protocol data unit (PDU) count transmitted on the data path; and ii) a time stamp $T_{LPU}$ characterizing the last path usage (LPU) of the data path.

14 Claims, 4 Drawing Sheets

(56) References Cited

U.S. PATENT DOCUMENTS

| | | |
|---|---|---|
| 10,237,871 B2 | 3/2019 | Belschner et al. |
| 2002/0018473 A1 | 2/2002 | Hassell et al. |
| 2008/0225711 A1 | 9/2008 | Raszuk et al. |
| 2010/0039957 A1 | 2/2010 | Kotrla et al. |
| 2010/0110922 A1 | 5/2010 | Ketheesan et al. |
| 2012/0026992 A1* | 2/2012 | Navda .................... H04W 4/60 370/338 |
| 2013/0029639 A1* | 1/2013 | Lee ....................... H04W 12/06 455/411 |

FOREIGN PATENT DOCUMENTS

| | | |
|---|---|---|
| EP | 3182778 A1 | 6/2017 |
| WO | WO 2017220149 A1 | 12/2017 |

\* cited by examiner

TECHNIQUES FOR DETECTING BURSTY TRAFFIC PATTERN DETECTION AND SCHEDULING MULTIPATH DATA TRAFFIC

CROSS-REFERENCE TO PRIOR APPLICATIONS

This application is a U.S. National Phase application under 35 U.S.C. § 371 of International Application No. PCT/EP2020/075755, filed on Sep. 15, 2020, and claims benefit to European Patent Application No. EP 19197770.1, filed on Sep. 17, 2019. The International Application was published in English on Mar. 25, 2021 as WO 2021/052953 A1 under PCT Article 21(2).

FIELD

The disclosure relates to techniques for detecting bursty traffic patterns and scheduling data traffic for transmission over multiple data paths from which at least one path is of a first type, in particular a cheap data path and at least another path of a second type, in particular an expensive data path. The disclosure relates to a data traffic analyzer to detect those bursty traffic patterns and a corresponding method. The disclosure further relates to a multipath scheduler device and a method for scheduling multipath data traffic.

BACKGROUND

Several multipath protocols like MPTCP according to "A. Ford and C. Raiciu and M. Handley and O. Bonaventure, "TCP Extensions for Multipath Operation with Multiple Addresses", RFC no. 6824, January 2013"; Multipath QUIC according to "Ryan Hamilton and Jana Iyengar and Ian Swett and Alyssa Wilk, "QUIC: A UDP-Based Secure and Reliable Transport for HTTP/2", draft-tsvwg-quic-protocol-02, January 2016", Huawei's GRE Tunnel Bonding Protocol "N. Leymann and C. Heidemann and M. Zhang and B. Sarikaya and M. Cullen, "Huawei's GRE Tunnel Bonding Protocol", RFC no. 8157, May 2017" and many others offer capacity aggregation over several paths. These paths may have different costs, e.g. cheap and expensive or expressed in other terms. For example, the cheap path may be a WiFi path and the expensive path may be an LTE (Long Term Evolution) path. Cost does not necessarily refer to a direct payment; it can also refer to latency, reliability and many others.

An often-used service over the internet is non-real-time video streaming which is typically of bursty nature. A video source tries to fill a buffer at the sink as fast as possible and stops if the buffer is full. As soon as the buffer is empty by some level, the source tries again to fill the sink buffer. In a multipath scenario, where additional capacity is provided, the video source will use all available data paths to fill the sink buffer as fast as possible and hence may combine the capacity of a cheaper path with the capacity of an expensive path. This behavior may be undesired for the customer, especially if the cheaper path is sufficient to satisfy the demand without significantly influencing the QoE (Quality of Experience).

Techniques are known to detect special kinds of bursty traffic patterns on the cheaper data path and to delay the overflowing traffic of the cheaper path, e.g. the peak traffic not fitting into the cheaper path, in order to fill it into the cheaper path at a later time, e.g. into the gaps between the bursts of the bursty data traffic, and hence avoid or at least limit using an expensive data path.

SUMMARY

In an exemplary embodiment, the present invention provides a data traffic analyzer for detecting bursty data traffic on a data path. The data traffic analyzer includes a processor and a non-transitory memory having processor-executable instructions stored thereon, wherein the processor is configured to execute the processor-executable instructions to facilitate the following being performed by the data traffic analyzer: measuring data traffic parameters of the data path; and analyzing the data traffic parameters of the data path to detect a bursty traffic pattern based on comparing the data traffic parameters to a time interval threshold $T_{Limit}$ which defines gaps between bursty data traffic. The measured traffic parameters include: i) a data traffic volume and/or a protocol data unit (PDU) count transmitted on the data path; and ii) a time stamp $T_{LPU}$ characterizing the last path usage (LPU) of the data path.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Techniques for detecting various kinds of bursty traffic patterns are desirable.

Exemplary embodiments of the present invention provide improved devices and/or techniques for detecting bursty traffic patterns and for efficiently scheduling data traffic in multipath scenarios where cheap and expensive paths are available.

The methods and systems presented below may be of various types. The individual elements described may be realized by hardware or software components, for example electronic components that can be manufactured by various technologies and include, for example, semiconductor chips, ASICs, microprocessors, digital signal processors, integrated electrical circuits, electro-optical circuits and/or passive components.

The devices, systems and methods presented below are capable of transmitting information over a communication network. The term communication network refers to the technical infrastructure on which the transmission of signals takes place. The communication network comprises the switching network in which the transmission and switching of the signals takes place between the stationary devices and platforms of the mobile radio network or fixed network, and the access network in which the transmission of the signals takes place between a network access device and the communication terminal. The communication network can comprise both components of a mobile radio network as well as components of a fixed network. In the mobile network, the access network is also referred to as an air interface and includes, for example, a base station (NodeB, eNodeB, radio cell) with mobile antenna to establish the communication to a communication terminal as described above, for example, a mobile phone or a mobile device with mobile adapter or a machine terminal. In the fixed network, the access network includes, for example, a DSLAM (digital subscriber line access multiplexer) to connect the communication terminals of multiple participants based on wires. Via the switching network the communication can be transferred to other networks, for example other network operators, e.g. foreign networks.

In communications and computing systems, the Open Systems Interconnection model (OSI model) defines a conceptual model that characterizes and standardizes the communication functions without regard to its underlying internal structure and technology. Its goal is the interoperability of diverse communication systems with standard protocols. The model partitions a communication system into abstraction layers. The original version of the model defined seven layers: Physical layer (Layer 1), Data Link layer (Layer 2), Network layer (Layer 3), Transport layer (Layer 4), Session layer (Layer 5), Presentation layer (Layer 6) and Application layer (Layer 7).

According to a first aspect, the invention relates to a data traffic analyzer that is configured for detecting bursty data traffic on a data path. The data traffic analyzer comprises a measuring unit configured to measure data traffic parameters of the data path, a processor unit configured to analyze the data traffic parameters of the data path, wherein the processor is configured to detect a bursty traffic pattern upon comparing the data traffic parameters to a time interval threshold $T_{Limit}$ which defines gaps between bursty data traffic. The measured traffic parameters are i) a data traffic volume and/or a PDU count transmitted on the data path and ii) a time stamp $T_{LPU}$ characterizing the last path usage (LPU) of the data path.

The time stamp $T_{LPU}$ characterizing the last path usage (LPU) of the data path when data was transmitted can be stored for multiple time points in a memory. Internally, an algorithm can associate each of these multiple $T_{LPU}$ values to new variables in order to distinguish those different time points and perform dedicated calculations. In particular, two $T_{LPU}$ values can be stored and the most recent time stamp can be renamed as timestamp $T_{Now}$ or $T_{LPU}$ for example.

An advantage of this invention is that the data traffic analyzer measures only two traffic parameters in order to detect various kinds of bursty traffic patterns. The single measurement of the time stamp stored as $T_{LPU}$, characterizing the last path usage, enables the processor unit only to detect gaps of bursty traffic patterns with a pure shape, which means without any kind of traffic in between those bursty peaks. This can simply be done by detecting the time difference between two different usage times ($T_{LPU, New}$ and $T_{LPU, old}$) of the data path. The additional measurement of the data traffic volume and/or the PDU count transmitted on the data path makes this method more robust with respect to minor traffic (for example control information traffic) in between the bursty peaks, because a certain amount of traffic can be allowed in between bursty peaks. In order to decide if a bursty traffic pattern exists, an algorithm is implemented on the processor which takes these two measurement parameters into account. Those two parameters obtain more information about the data traffic than considering only $T_{LPU}$. Therefore, the data traffic analyzer is able to detect spurious demand on an expensive path in a multipath setup, which may include non-real-time video streaming (continuous bursty traffic pattern) or website requests (single traffic burst). Hence, the simple measurement of $T_{LPU}$ might not be sufficient to detect burstiness in many scenarios.

The time interval threshold $T_{Limit}$ represents a predefined duration that a gap between bursty traffic peaks should have at least. $T_{Limit}$ can be specified by the operator of the multipath setup and can have different values depending on various situations and demands. For example, the value of $T_{Limit}$ can vary depending on the level of QoE the network provider guarantees to a user. The higher the QoE should be, the shorter is $T_{Limit}$ to be set. The data traffic volume is the data volume, which is transmitted on the data path that can for example be measured in bytes or in bytes per second. In telecommunications, a protocol data unit (PDU) is a single unit of information transmitted among peer entities of a computer network.

A PDU is composed of protocol specific control information and user data. In the layered architectures of communication protocol stacks, each layer implements protocols tailored to the specific type or mode of data exchange. For example, the Transmission Control Protocol (TCP) implements a connection-oriented transfer mode, and the PDU of this protocol is called a segment, while the User Datagram Protocol (UDP) uses datagrams as protocol data unit for connection-less transfer. A layer lower in the Internet protocol suite, at the Internet layer, the PDU is called a packet, irrespective of its payload type.

The $T_{LPU}$ is the time stamp, which characterizes the last path usage (LPU) of the data path—in other words. Every time the path is used a time stamp is stored as $T_{LPU}$. To distinguish different time stamps, the latest use of the data path can be named as $T_{LPU, New}$ and the use of the data path before can be named as $T_{LPU, old}$. The time difference of $T_{LPU, New}$ and $T_{LPU, old}$ represents a duration without any data traffic on the data path.

In an embodiment, the processor is configured to calculate a time interval $T_{GAP}$ from the measured traffic parameters, which characterizes gaps of the bursty traffic. This provides the advantage that a value is generated that can be directly compared to the interval threshold $T_{Limit}$. $T_{GAP}$ represents a measured value of the gap duration.

In a further embodiment, the processor is configured to trigger a bursty traffic signal if $T_{GAP}$ is larger than $T_{Limit}$. This offers two benefits: It is possible to predefine different values of $T_{Limit}$, which correspond to different needs of the multipath operator or traffic situations on the data paths. For example, if bursty traffic patterns shall be detected aggressively one could choose a lower value for $T_{Limit}$. If the calculated $T_{GAP}$, which represents a measured value of the gap duration, is larger than $T_{Limit}$ the algorithm implemented on the processor decides that a bursty traffic pattern has been detected and sends a bursty traffic signal which can be perceived and processed by other devices. These measurements and comparisons are carried out continuously which means that the data path is monitored at all times with respect to bursty traffic patterns. It is also possible, that the processor sends a non-bursty traffic signal if it detects that $T_{GAP}$ is smaller than $T_{Limit}$.

Preferably, the processor is configured to calculate $T_{no\ traffic} = T_{LPU,\ new} - T_{LPU,\ old}$ as a time interval without any traffic on the data path and to set $T_{GAP} = T_{no\ traffic}$ if $T_{no\ traffic}$ is larger than a predefined threshold $T_{no\ traffic,\ min}$ or to reset both $T_{GAP}$ and $T_{no\ traffic}$ if $T_{no\ traffic}$ is smaller than $T_{no\ traffic,\ min}$. $T_{no\ traffic,\ min}$ might be predefined in the same way as $T_{Limit}$.

This provides the advantage that the single measurement of $T_{LPU}$ can already be sufficient to detect the bursty traffic pattern. The variability of $T_{no\ traffic,\ min}$ allows the no traffic period to be set to any value. For example, if $T_{no\ traffic,\ min} = 0$ ms even the shortest no traffic period adds to $T_{GAP}$. Another preferred value is $T_{no\ traffic,\ min} = 10$ ms. One more preferred value is $T_{no\ traffic,\ min} = 50$ ms. These measurements are carried out continuously which means that the data path is monitored even within the peaks of the bursty traffic. If $T_{no\ traffic,\ min}$ is for example 50 ms, then it is very likely that the gap detection will fail within the peaks or continuous usage of the path like a download, because there is high data traffic all the time. In those situations, the detection measurement starts automatically again by resetting both $T_{GAP}$ and $T_{no\ traffic}$ if $T_{no\ traffic}$ is smaller than $T_{no\ traffic,\ min}$ and the algorithm on the processor is ready for the next gap detection.

In an embodiment, the processor is configured to set $T_{GAP} = T_{VOLUME,\ Max}$ if at most a prescribed data amount and/or a number of PDUs is transmitted on the data path within the time interval $T_{VOLUME,\ Max}$ or to reset $T_{GAP}$ if the prescribed data amount and/or the number of PDUs is exceeded.

This provides the advantage that the network provider can specify in advance which amount of minor traffic is allowable within the time interval $T_{VOLUME,\ Max}$. Again, the values $T_{VOLUME,\ Max}$, and the prescribed data amount and/or a number of PDUs are set in advance with regard to certain demands. For example, it can be allowed that 100 PDUs are transmitted over the path in $T_{VOLUME,\ Max} = 100$ ms. The resetting of $T_{GAP}$ serves for the same purpose as explained above. The data traffic analyzer is throughout the whole duration of data transfer ready for the gap detection. If $T_{no\ traffic,\ min}$ is set to be 0 ms, than the bursty traffic pattern detection is basically only done by measuring the data amount within $T_{VOLUME,\ Max}$.

In an embodiment, the processor is configured to set $T_{GAP} = T_{VOLUME,\ Max} + T_{no\ traffic}$. It follows that the total value of $T_{GAP}$ can be calculated as the sum of the subphases $T_{VOLUME,\ Max}$ and $T_{no\ traffic}$. In contrast to a single $T_{LPU}$ measurement, the detection of bursty traffic patterns is more relaxed and robust against occasional traffic between individual bursts. By summing up the two subphases, $T_{GAP}$ gets larger by only considering a single subphase, which increases the likelihood that it exceeds $T_{Limit}$ and that a bursty traffic pattern is detected. It is also possible to add more subphases and to arrange their order differently.

According to a second aspect, the invention relates to a method for detecting bursty data traffic on a data path, the method comprising:
measuring data traffic parameters of the data path,
analyzing the data traffic parameters of the data path and detecting a bursty traffic pattern upon comparing the data traffic parameters to a time interval threshold $T_{Limit}$ which defines gaps between bursty data traffic,
wherein the traffic parameters are
i) a data traffic volume and/or a PDU count transmitted on the data path,
ii) a time point $T_{LPU}$ characterizing the last path usage (LPU) of the data path.

Such a method can efficiently detect bursty traffic patterns on a data path. It is more relaxed and robust against occasional traffic between individual traffic bursts than a measurement that is only based on measuring $T_{LPU}$.

According to a third aspect, the invention relates to a multipath scheduler device for scheduling data traffic for transmission via a first type data path and a second type data path, the multipath scheduler comprising:
a first type data path;
a second type data path;
a data traffic analyzer as described above is assigned to the first type data path and configured for detecting bursty data traffic pattern on the first type data path on basis of traffic parameters of the first type data path; and
a scheduler configured to schedule a first amount of the data traffic for transmission via the first type data path and to schedule a second amount of the data traffic via the second type data path, wherein access to the second type data path is delayed which forces the second amount of the data traffic to be transmitted via the first type data path,
wherein the data traffic analyzer is configured to send a bursty traffic signal to the scheduler upon detecting bursty traffic pattern and that the scheduler is configured to delay access to the second type data path upon the bursty traffic signal.

It is assumed that the second type data path is an expansive data path and the first type data path is a cheap data path for a user or a network provider. Then this solution provides the advantage that a data amount that is larger the capacity of the first type data path, especially non-real-time video traffic which typically shows a bursty traffic pattern, is only transmitted via the first type data path even if a second type data path is available for high data volume situations. The second amount of data traffic, which would normally be transmitted over the second type data path, is delayed if the data traffic analyzer detects a bursty traffic pattern and sends the bursty traffic signal. In those bursty traffic patterns, the data traffic of the second type data path may fall in the gap between two peaks of bursty data traffic and can be transmitted by the cheaper first type data path without affecting the quality of experience for user. The multipath scheduler device is not limited to two paths, it can handle any number of paths as long as there is an information about path costs.

The second type data path can be more expensive with respect to latency, reliability, capacity, complexity and/or costs. The invention enables that traffic can be flexible transmitted via different data paths, which have different costs, for example via a cheap WiFi data path and an expensive LTE data path. Cost does not necessarily refer to a direct payment; it can also refer to latency, reliability and many others.

In an exemplary implementation form of the multipath scheduler device, a switch is arranged between the at least one first type data path and the at least one second type data path, wherein the switch decides if the data shall be transmitted via the first type data path or the second type data path. If the switch receives the bursty traffic signal, it can "block" or delay the data transfer over the second type data path for a certain time duration. This forces the second amount of traffic to be transmitted why are the cheaper first type data path.

In an exemplary embodiment of the multipath scheduler device, the scheduler is configured to delay access to the at least one second type data path for a time interval $T_{Delay}$.

This provides the advantage that the delay for the second amount of the data traffic can be suitably selected in order to provide adequate usage of the cheap and expensive data paths. A minimum delay can be adjusted during which the second type data path, i.e. the expensive data path is not used.

In an embodiment, $T_{Delay}$ is a function of the data traffic parameters. This provides the advantage that $T_{Delay}$ can be adjusted appropriately to various data traffic patterns and at the same time ensuring good quality of experience for a user. For example, if the analysis of the data traffic parameters by the data traffic analyzer shows that bursty traffic patterns were detected regulatory over an immediately preceding period of time than it can be assumed that the next data burst is also related to a bursty traffic pattern even if $T_{GAP}$ is smaller than $T_{Limit}$. To moderate the effect if this assumption would be wrong one could set $T_{Delay}=T_{Delay}/2$. Another option is to increase or decrease the time interval of $T_{Delay}$ according to the difference $T_{GAP}-T_{Limit}$. For example, if $T_{GAP}=2*T_{Limit}$ one could set $T_{Delay}=T_{Delay}*2$.

In an exemplary implementation form of the multipath scheduler device, the scheduler is configured to delay access to the at least one second type data path based on an access limitation function.

This provides the advantage that the access limitation function provides less strict access to the second type data path than the delay function. Hence, a more smooth access to the second type data path can be realized. The access limitation function comprises a slope function, in particular an exponential function, a ramp function or a step function. This provides the advantage that various designs can be implemented to realize the access limitation function. Depending on the traffic situation an adequate access limitation function can be selected, thereby providing a high degree of flexibility.

In an embodiment, the scheduler is configured to delay access to the second type data path for a time interval $T_{Start\ Delay}$ without requiring the bursty traffic signal, especially at the beginning of a data transmission.

This provides the advantage that it is possible to force the second amount of the data traffic to be transmitted via the first type data path even in situations where it is not possible to determine if a bursty traffic pattern exists, because the prediction of a bursty traffic peak requires the analysis of the traffic parameters in advance, which is not possible at the beginning of data transmission.

In an embodiment, the scheduler is configured to delay access to the second type data path until a data traffic on the first type data path has exceeded a predefined data volume threshold $V_{Start\ Delay}$ without requiring the bursty traffic signal, especially at the beginning of a data transmission.

This provides the advantage that it is possible to force the second amount of the data traffic to be transmitted via the first type data path even in situations where it is not possible to determine if a bursty traffic pattern exists. As long as the data traffic volume on the first type data path is below $V_{Start\ Delay}$ it can be assumed that the first type data path is able to compensate the data traffic, which is over the capacity of the first type data path without affecting the quality of experience for the user. $V_{Start\ Delay}$ can be predefined by the network provider. It is also possible to adjust $V_{Start\ Delay}$ to typical data traffic patterns of the user. It is likely that users have different data traffic behavior depending on the time of day. In the morning, it is more common to listen to music, which requires lower data traffic then in the evening where it is more likely that the user watches videos. $V_{Start\ Delay}$ can be adjusted to those situations and can therefore become a time-dependent threshold.

In an embodiment, the scheduler is configured to delay access to the second type data path until a number of PDUs on the first type data path has exceeded a predefined number of PDUs threshold $PDU_{Start\ Delay}$ without requiring the bursty traffic signal, especially at the beginning of a data transmission. This provides the advantage that it is possible to force the second amount of the data traffic to be transmitted via the first type data path even in situations where it is not possible to determine if a bursty traffic pattern exists. The number of PDUs is a data traffic measure, which is different from the data traffic volume. Therefore, defining a threshold $PDU_{Start\ Delay}$ makes the scheduler even more flexible to compensate bursty traffic than measuring $V_{Start\ Delay}$ alone.

According to a fourth aspect, the invention relates to a method for scheduling multipath data traffic for transmission via a first type data path and a second data type path, the method comprising:
    analyzing a data traffic of the first type data path according to the method described above with respect to detect a bursty data traffic pattern on the first type data path,
    scheduling a first amount of the data traffic for transmission via the first type data path and scheduling a second amount of the data traffic via the second type data path, wherein access to the second type data path is delayed which forces the second amount of the data traffic to be transmitted via the first type data path,
    wherein the data traffic analyzer sends a bursty traffic signal to the scheduler if it detects bursty traffic behavior and that the scheduler delays access to the second type data path upon the bursty traffic signal.

Such a method can efficiently schedule bursty data traffic in multipath scenarios where cheap and expensive paths are available. The overflowing traffic of a cheaper path, e.g. the peak traffic not fitting into the cheaper path, can be delayed in order to fill it into the cheaper path at a later time, e.g. into the gaps between the bursts of the bursty data traffic.

According to a fifths aspect, the invention relates to a communication system for generating data traffic and transmitting the data traffic to a receiver, the communication system comprises:
    a generator configured to generate to data traffic and to transmit the data traffic on an aggregated data path,
    a multipath scheduler device as described above, wherein the aggregated data path connects the generator and the multipath scheduler, wherein the multipath scheduler transmits the data traffic via a first type data path and a second type data path to the receiver,
    a data traffic analyzer as described above,
    wherein the data traffic analyzer is assigned to the aggregated data path between the generator and the multipath scheduler device and/or the traffic analyzer is assigned to the first type data between the multipath scheduler device and the receiver.

Such a communication system can efficiently schedule its generated data traffic in multipath scenarios where cheap and expensive paths are available to a receiver. The overflowing traffic of a cheaper path, e.g. the peak traffic not fitting into the cheaper path, can be delayed in order to fill it into the cheaper path at a later time, e.g. into the gaps between the bursts of the bursty data traffic. At both locations, the data traffic analyzer can efficiently measure the required data traffic parameters in order detect bursty traffic patterns.

Embodiments of the invention can be implemented in hardware and/or software.

The following acronyms are applied in this disclosure:

| | |
|---|---|
| GRE | Generic Routing Encapsulation |
| LPU | Last Path Usage |
| MPTCP | Multipath TCP |
| OSI | Open System Interconnection |
| QUIC | Quick UDP Internet Connections |
| TCP | Transport Control Protocol |
| UDP | User Datagram Protocol |
| PDU | Protocol data unit |

In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
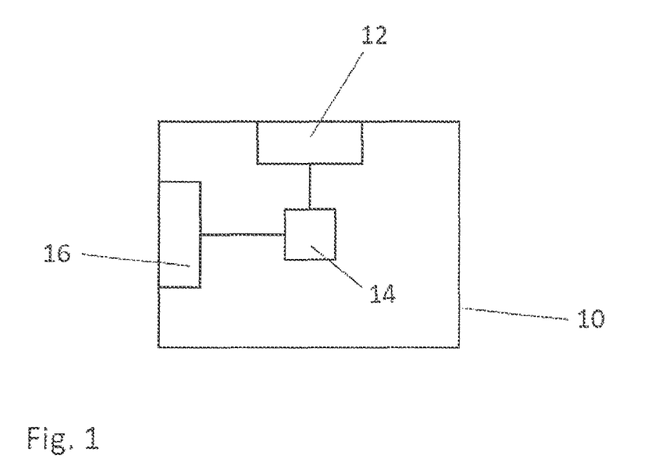
FIG. 1 shows a data traffic analyzer according to the invention.

FIG. 1 shows a data traffic analyzer 10 according to the invention. The data traffic analyzer 10 comprises a measuring unit 12, which is assigned to a data path. The measuring unit 12 enables the data traffic analyzer 10 to measure various data traffic parameters of that data path. In particular, the measuring unit 12 is configured to measure a data traffic volume and/or a PDU count and a time stamp $T_{LPU}$ characterizing the last path usage (LPU) of the data path. The measuring unit 12 is configured to transmit those data traffic parameters to a processor unit 14 of the data traffic analyzer. A dedicated algorithm is implemented on the processor unit 14, which analyzes the data traffic parameters with respect to detecting bursty traffic patterns. If the processor unit 14 detects bursty traffic patterns, a bursty traffic signal is transmitted to an interface 16 of the data traffic analyzer 10. The interface 16 is configured in order to communicate the bursty traffic signal to other devices or units. It will be described below how the algorithm detects bursty traffic patterns.

Figure 2:
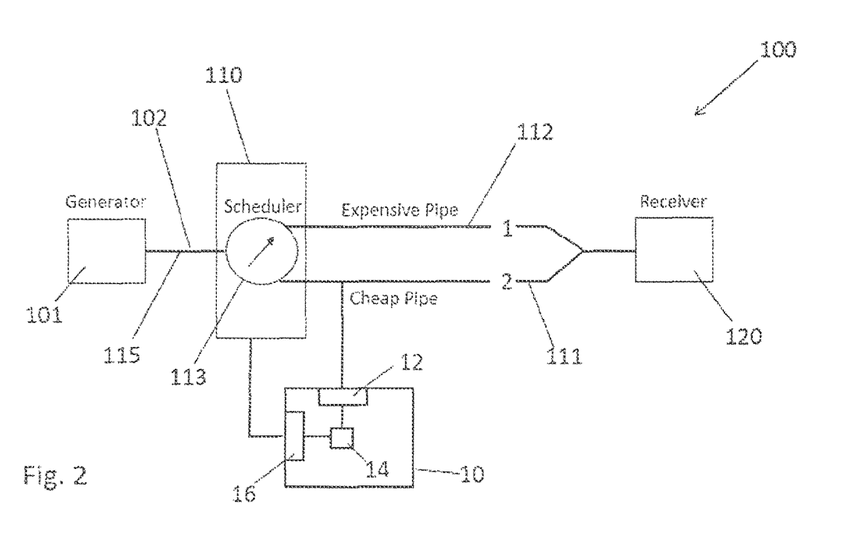
FIG. 2 shows an exemplary multipath communication system with two paths of different types, in particular of different cost according to the disclosure and with the data traffic analyzer of FIG. 1 assigned to one data path.

FIG. 2 shows an exemplary multipath communication system 100 with two paths of different type, in particular of different cost. On transmit side, a generator 101 is used to generate data traffic 102 for a scheduler 113 of a multipath scheduler device 110. The scheduler 113 schedules the data traffic 102 for transmission via a first type data path (1) 111 which is associated with a cheap pipe and transmission via a second type data path (2) 112 which is associated with an expensive data pipe. At receiver side, both data paths 111, 112 are combined for reception at a receiver 120. The data traffic analyzer 10 is assigned to the first type data path 111 and measures the data traffic parameters of first type data path 111 with its measuring unit 12. Via the interface 16, the data traffic analyzer 10 sends signals to the multipath scheduler device 110.

FIG. 2 depicts a generic approach for multipath usage, where each of the above mentioned protocols, i.e. MPTCP, Multipath QUIC and Huawei's GRE Tunnel Bonding Protocol can be applied. FIG. 2 differentiates between two paths 111, 112, which have different costs (cheap, expensive). Cost does not necessarily refer to a direct payment, it can also refer to latency, reliability and many others. A single OSI Layer 3 or OSI Layer 4 connection can already profit from an increased capacity.

An often used service over the internet is non-real-time video streaming. A common traffic pattern therefore, if the capacity on the path is not the bottleneck, is bursty with gaps in between. The video source tries to fill a buffer at the sink as fast as possible and stops if the buffer is full. As soon as the buffer is empty by some level, the source tries again to fill the sink buffer as fast as possible.

To solve or mitigate the above described technical problem, the disclosure presents a solution that is based on delaying the usage of an expensive path. The concept is not limited to two paths as shown in FIG. 2 for illustrative purpose, it can handle any number of paths as long as there is an information about path cost. The data traffic analyzer 10 tries all the time to detect a bursty traffic pattern, e.g. by recognizing a peak behavior on the expensive path 112. If it detects peak behavior it sends a bursty traffic signal to the multipath scheduler device 110 that delays the access to the expensive path 112 for a time interval $T_{Delay}$. If a longer request than $T_{Delay}$ to the expensive path 112 is observed, access is given, because a peak is not assumed anymore or the cheaper path 111 cannot fulfill capacity demand.

In the following, the multipath scheduler device 110 is described in more detail.

The multipath scheduler device 110 can be used for scheduling data traffic 102 for transmission via at least one first type data path, e.g. path 111 as shown in FIG. 2 and at least one second type data path, e.g. path 112 as shown in FIG. 2. The multipath scheduler device 110 comprises: at least one first type data path 111; at least one second type data path 112; and a scheduler 113. The scheduler 113 is configured to schedule the a first amount of data traffic 102 for transmission via the at least one first type data path 111 and to schedule a second amount of data traffic 102 for delayed transmission via the at least one second type data path 112. In an exemplary implementation, the scheduler 113 may be configured to schedule the data traffic 102 for delayed transmission via the at least one second type data path 112 based on a capacity threshold 201 of the at least one first type data path 111, e.g. as shown in FIGS. 3 to 8 and/or based on a traffic distribution function. The capacity usage of the at least one first type data path 111 as threshold to overflow into the at least one second type data path 112 is of descriptive nature throughout this disclosure. Any kind of distributing function can be combined with delaying transmission via the at least one second type data path.

The data traffic 102 transmission via the at least one second type data path 112 is more expensive than data traffic 102 transmission via the at least one first type data path 111, in particular more expensive with respect to latency, reliability, capacity, complexity and/or cost. The scheduler 113 may be configured to schedule the data traffic 102 for delayed transmission via the second type data path 112 if a bursty traffic pattern of the data traffic 102 is detected by the data traffic analyzer 10. The data traffic analyzer 10 may be configured to detect a bursty traffic pattern based on a peak behavior of data traffic 102 scheduled for transmission via the at least one second type data path 112 and/or an aggregated data path 115 that connects the generator 101 and the multipath scheduler device 110.

The scheduler 113 is configured to delay access to the at least one second type data path 112 based on bursty traffic signal trigger. The bursty traffic signal trigger is send by the data traffic analyzer 10 if a measured time interval $T_{Gap}$, which characterizes the distance between two data traffic peaks, is larger than a predefined threshold $T_{Limit}$. The trigger may be based on a single measurement of the last path usage as described below with respect to FIG. 5 and a corresponding path access delay, $T_{Delay}$ 403 (see FIG. 5). The trigger which is only based on the single measurement $T_{LPU}$ is in most cases too sensitive to calculate appropriate values of $T_{Gap}$. $T_{Gap}$ is calculated as $T_{Gap}=T_{LPU, new}-T_{LPU, old}$, with $T_{LPU}$ being the time stamp of the last path usage. It follows that already minor traffic resets the $T_{Gap}$ measurement yielding in very small values of $T_{Gap}$. To make this measurement more relaxed and robust against occasional minor traffic, the invention bases the decision to send a bursty traffic signal on at least an additional data traffic parameter. This will be described in FIG. 6.

Figure 3:
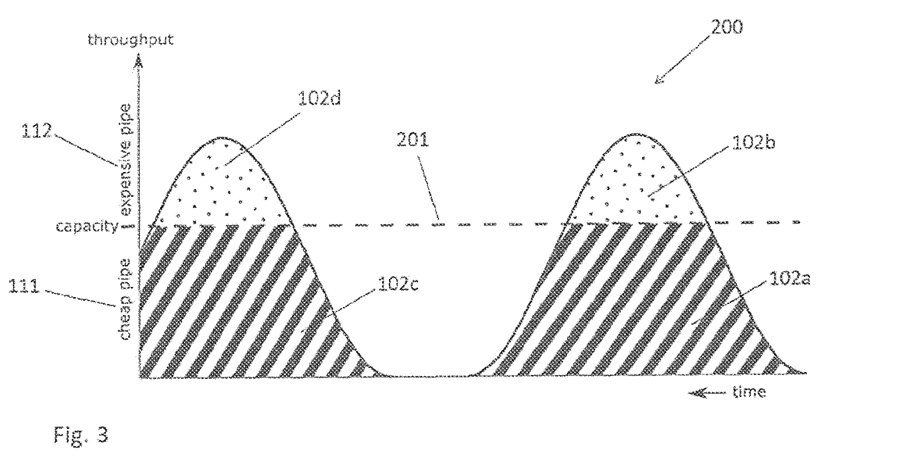
FIG. 3 shows a throughput diagram illustrating an exemplary traffic pattern in a multipath scenario, which requires overflow from one to another path according to the disclosure.

FIG. 3 shows a throughput diagram 200 illustrating an exemplary traffic pattern in a multipath scenario, which requires overflow from one to another path according to the disclosure. As described above with respect to FIG. 2, an often used service over the Internet is non-real-time video streaming. A common traffic pattern therefore, if the capacity on the path is not the bottleneck, is bursty with gaps in between. A similar traffic pattern is shown in FIG. 2. In case of a multipath scenario, where additional capacity is provided, bursty traffic is tempted to use this and combines eventually the capacity of a cheaper path 111 with the capacity of an expensive path 112.

In the example of FIG. 3, past time is on the right side of time axis while current time is shown in the origin of the diagram. The traffic is bursty with a first burst comprising a basic traffic 102a and a peak traffic 102b and a second burst comprising a basic traffic 102c and a peak traffic 102d. A capacity threshold 201 denotes the limit between basic traffic and peak traffic. The basic traffic 102a, 102c of each burst is filling the cheap pipe 111 while the peak traffic 102b, 102d of each burst is filling the expensive pipe 112.

Figure 4:
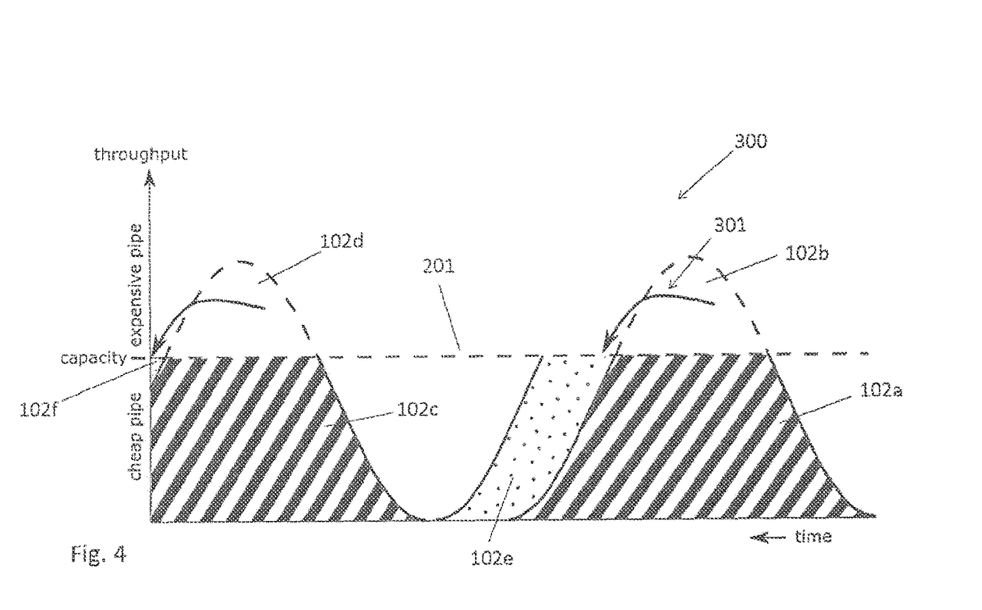
FIG. 4 shows a throughput diagram illustrating an ideal shift of overflowing traffic into the cheaper path according to the disclosure.

FIG. 4 shows a throughput diagram 300 illustrating an ideal shift 301 of overflowing traffic into the cheaper path. In this diagram, past time is on the right side of time axis while current time is shown in the origin of the diagram. The traffic corresponds to the traffic shown in FIG. 3, it is bursty with a first burst comprising a basic traffic 102a and a peak traffic 102b and a second burst comprising a basic traffic 102c and a peak traffic 102d. The peak traffic 102b, 102d is shifted from the expensive pipe 112 to the cheap pipe 111. The shifted data traffic is denoted by reference signs 102e and 102f. The capacity threshold 201 denotes the limit between basic traffic and peak traffic. In this example, the capacity of the cheaper path 111 is sufficient and the overflow 102b, 102d fits into the gaps between the bursts as shown in FIG. 4. In principle, bursty traffic patterns are not limited to non-real-time video streaming services, it is just an example.

Figure 5:
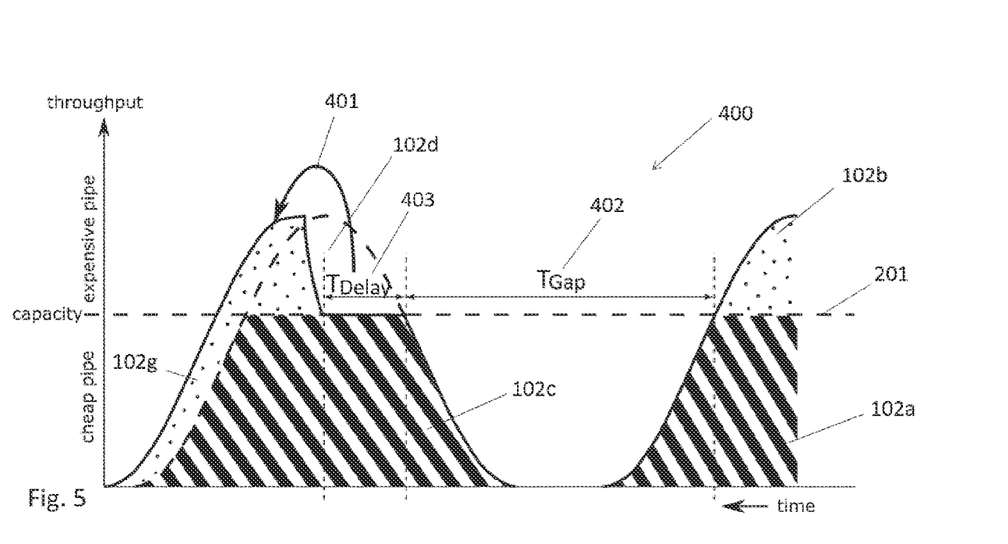
FIG. 5 shows a throughput diagram illustrating a peak detection based on one traffic parameter and path usage delay on expensive path.

FIG. 5 shows a throughput diagram 400 illustrating a peak detection and path usage delay on expensive path according to the disclosure. In this diagram, past time is again on the right side of time axis while current time is shown in the origin of the diagram. The traffic corresponds to the traffic shown in FIGS. 3 and 4, it is bursty with a first burst comprising a basic traffic 102a and a peak traffic 102b and a second burst comprising a basic traffic 102c and a peak traffic 102d. The peak traffic 102d is at least partially shifted 401 with a delay time, $T_{Delay}$ 403 from the expensive pipe 112 to the cheap pipe 111. The at least partially shifted data traffic is denoted by reference sign 102g. The capacity threshold 201 denotes the limit between basic traffic and peak traffic.

In the implementation shown in FIG. 5 the time stamps of last path usage $T_{LPU}$ are measured. Then $T_{Gap}=T_{LPU, new}-T_{LPU, old}$ is calculated. The corresponding path access delay $T_{Delay}$ 403 is predefined. If $T_{GAP}$ is higher than the defined threshold $T_{Limit}$, access to the path is denied by the time interval $T_{Delay}$ 403. This will give the cheaper path 111 the possibility, if capacity is available, to transmit a greater part of the overall request.

The method described in FIG. 5 has the downside that it yields in small time intervals of $T_{Gap}$ in situations of minor traffic like website requests between the peaks. Therefore, the invention provides a method and a data traffic analyzer which is more relaxed and robust against occasional traffic between individual traffic peaks.

Figure 6:
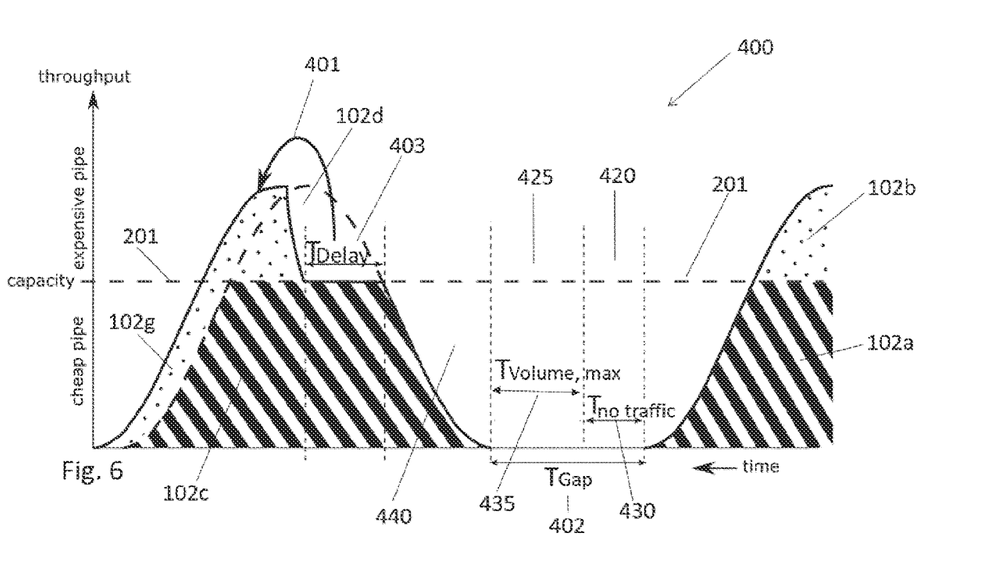
FIG. 6 shows a throughput diagram illustrating a peak detection based on multiple traffic parameters and path usage delay on expensive path according to the invention.

The method to take minor traffic appropriately into account is carried out by the data traffic analyzer 10 and described in FIG. 6: Henceforth more parameters are measured and evaluated in combination to detect the bursty traffic pattern. Those parameters can be monitored individually per path within the multipath system or comprehensively over all paths simultaneously. The last case is shown in FIG. 6. The measurement is now divided in two subphases 420, 425 for making the method more robust. The time interval Tao traffic that belongs to the first subphase 420 specifies and time interval in which no transmission is allowed, otherwise $T_{Gap}$ is reset and the detection measurement starts again. The time interval $T_{no\ traffic}$ is predefined and can take values from 0 ms, 10 ms, 50 ms to 100 ms. If $T_{no\ traffic}$ is 0 ms than the condition of no traffic within the time interval $T_{no\ traffic}$ is always true. It follows, that the higher $T_{no\ traffic}$ is predefined, the likelier it is that traffic is observed within that time interval and the measurement is reset. If no measurement is observed within $T_{no\ traffic}$, than $T_{Gap}=T_{LPU, new}-T_{LPU, old}$, which is the difference between the last and newest traffic on the data path. If $T_{Gap}$ is larger than $T_{Limit}$ then the processor of the data traffic analyzer triggers a bursty traffic signal to the multipath scheduler device 113.

The detection measurement then enters the second subphase 425. The time interval $T_{Volume, max}$ is predefined and specifies a time interval in which only a certain number of PDUs counts or data volume is allowed. One among multiple possibilities to define $T_{Volume, max}$ is $T_{Volume, max}=T_{Limit}-T_{no\ traffic}$. If the number of measured PDU count or data volume exceeds the allowed number, $T_{Gap}$ is reset and the measurement starts again. On the other hand, if the number of measured PDU count or data volume is within the allowed number or data volume, then $T_{Volume, max}$ is added to $T_{Gap}$. In programming language this adding could be written as $T_{Gap}=T_{Gap}+T_{Volume, max}$. If $T_{Gap}$ is larger than $T_{Limit}$ then the processor of the data traffic analyzer triggers a bursty traffic signal to the multipath scheduler device 113.

The detection measurement of the subphase is 420, 425 is performed all the time. In cases of high traffic, especially when the capacity threshold 201 is reached, both measurements are reset within very short time periods until the data traffic becomes less and enters the "valley" 440 between the data peaks 102b, 102d.

Upon receiving the bursty traffic signal, the multipath scheduler device 113 delays the access to the expensive data path 112 by the time delay $T_{Delay}$ 403. At least a partial amount of the data traffic, the shifted data traffic 102g, is therefore transmitted by the cheaper data path 111 instead via the expensive data path 112. In principle, the subphases 420, 425 can be arranged in any combination and with additional or fewer subphases.

If a bursty traffic signal was generated and the shifted data traffic 102g was sent via the cheaper data path 111 this affects the time of no traffic $T_{no\ traffic}$ and the data traffic volume $T_{Volume,\ max}$ within the next "valley" 440. Therefore, even if nothing has changed on the data traffic pattern and the cheaper data path 111 was able to successfully transmit all the data, it might happen, that no bursty traffic pattern is detected because the delayed shifted data traffic 102g effects the measurement of $T_{no\ traffic}$ and $T_{Volume,\ max}$. In those cases, the fact that the previous bursty traffic pattern was detected can be incorporated in the next detection measurement. One possible way to make the measurement more robust against shifted data traffic 102g is to decrease the time interval $T_{no\ traffic}$ and to increase $T_{Volume,\ max}$ and the data volume allowed within $T_{Volume,\ max}$. Those values can be optimized until the valley 440 is completely filled with shifted data traffic 102g.

The methods described in FIG. 6 relies on the measurement of the data traffic on the cheaper data path 111 in order to be able to detect bursty traffic patterns. Nevertheless, the method of the invention shall also be able to prevent access to the expensive path 112 in case of transmissions causing only a single traffic peak or in other words at the beginning of a transmission. Those situations can especially happen in a single burst request, like opening a website.

Figure 7:
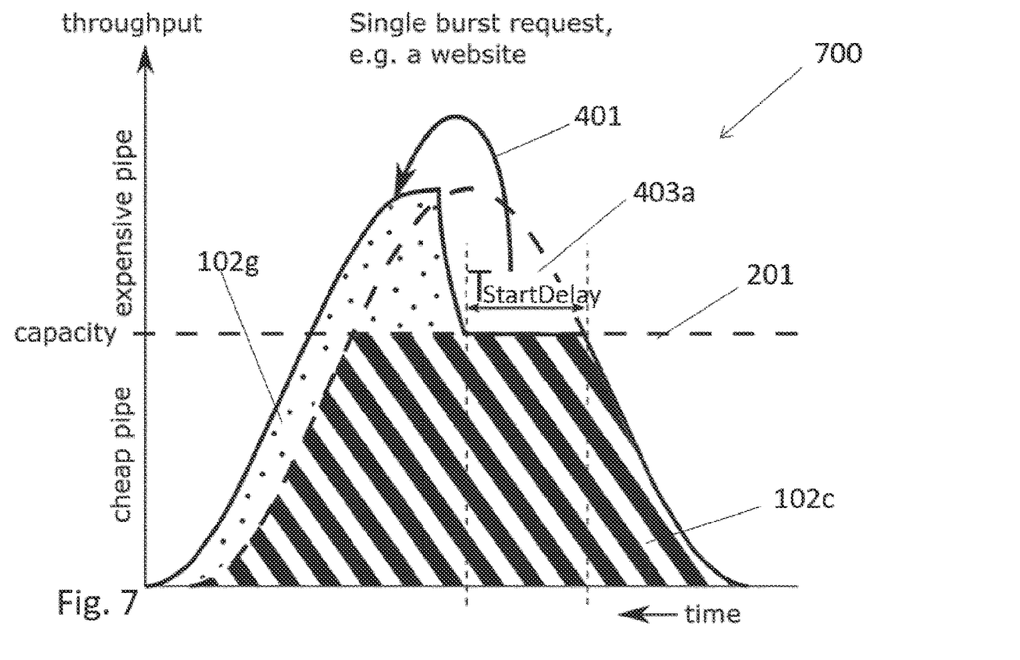
FIG. 7 shows a throughput diagram illustrating a path usage delay on expensive path independent of a peak detection.

FIG. 7 shows a throughput diagram 700 illustrating such a single burst request. In this situation, the detection of a bursty traffic pattern is not based on $T_{no\ traffic}$ and $T_{Volume,\ max}$ but on a predefined allowed data volume and/or number of PDUs. For example, as long as the data volume is below 5 MB, the access to the expensive data path 111 is delayed. A time interval $T_{Start\ Delay}$ is introduced, which prevents access to the expensive data path 112 at the beginning of the transmission within a data communication, without requiring the detection of bursty traffic pattern according to FIG. 6. $T_{Start\ Delay}$ can be different or identical to $T_{Delay}$. Again, the shifted data traffic 102g is transmitted via the cheaper data path 111. The delayed access based on $T_{Start\ Delay}$ can be triggered within one communication multiple times with different thresholds.

Figure 8:
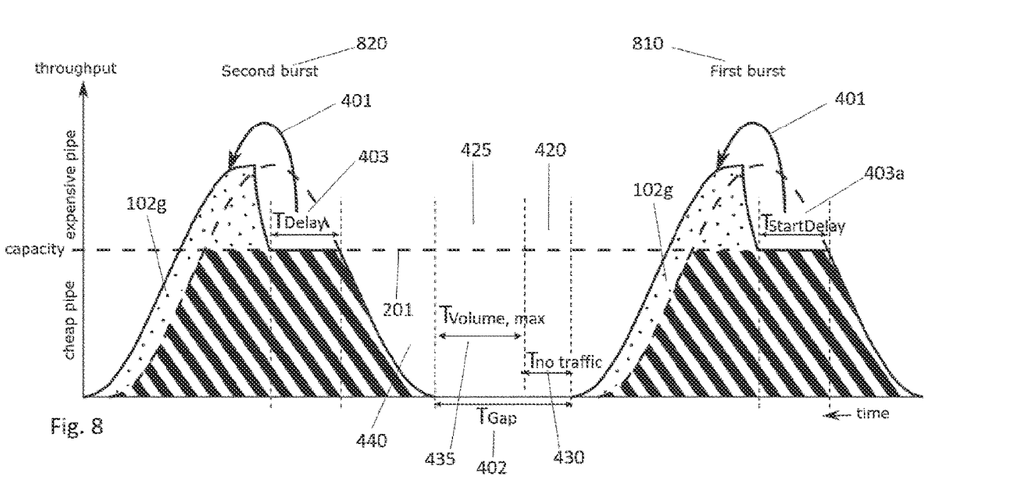
FIG. 8 shows a throughput diagram illustrating a combination of FIG. 6 and FIG. 7.

FIG. 8 shows a throughput diagram 800 illustrating a combination of FIG. 6 and FIG. 7. The data traffic communication starts with a first burst 810. Since no data traffic has occurred before, the method according to FIG. 6 is not able to detect any bursty traffic pattern and to send the appropriate bursty traffic signal to the multipath scheduler device 113. Nevertheless, access to the expensive data path 112 is delayed by the method described with respect to FIG. 7. $T_{Start\ Delay}$ forces an amount of data, the shifted data traffic 102g, to be transmitted via the cheaper data path 111. After the first burst 810, the detection measurement according FIG. 6 can be executed. If a bursty traffic pattern is detected by the data traffic analyzer 10, a bursty traffic signal is sent to the multipath scheduler 113 and access to the expensive data path 112 is delayed by $T_{Delay}$.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A data traffic analyzer for detecting bursty data traffic on a data path, the data traffic analyzer comprising a processor and a non-transitory memory having processor-executable instructions stored thereon, wherein the processor is configured to execute the processor-executable instructions to facilitate the following being performed by the data traffic analyzer:
   measuring data traffic parameters of the data path; and
   analyzing the measured data traffic parameters of the data path to detect a bursty traffic pattern based on comparing the measured data traffic parameters to a time interval threshold $T_{Limit}$ which defines gaps between bursty data traffic;
   wherein the measured data traffic parameters include:
   i) a data traffic volume and/or a protocol data unit (PDU) count transmitted on the data path; and
   ii) a time stamp $T_{LPU}$ characterizing the last path usage (LPU) of the data path.

2. The data traffic analyzer of claim 1, wherein the processor is further configured to execute the processor-executable instructions to facilitate the following being performed by the data traffic analyzer:
   calculating a time interval $T_{GAP}$ from the measured data traffic parameters, wherein the time interval $T_{GAP}$ characterizes gaps of the bursty traffic.

3. The data traffic analyzer of claim 2, wherein the processor is further configured to execute the processor-executable instructions to facilitate the following being performed by the data traffic analyzer:
   triggering a bursty traffic signal based on $T_{GAP}$ being larger than $T_{Limit}$.

4. The data traffic analyzer of claim 3, wherein the processor is further configured to execute the processor-executable instructions to facilitate the following being performed by the data traffic analyzer:

calculating $T_{no\ traffic} = T_{LPU,\ new} - T_{LPU,\ old}$ as a time interval without any traffic on the data path and setting $T_{GAP} = T_{no\ traffic}$ based on $T_{no\ traffic}$ is larger than a predefined threshold $T_{no\ traffic,\ min}$; or resetting both $T_{GAP}$ and $T_{no\ traffic}$ based on $T_{non\ traffic}$ being smaller than $T_{no\ traffic,\ min}$.

5. The data traffic analyzer of claim 3, wherein the processor is further configured to execute the processor-executable instructions to facilitate the following being performed by the data traffic analyzer:

setting $T_{GAP} = T_{VOLUME,\ Max}$ based on at most a prescribed data amount and/or a number of PDUs being transmitted on the data path within the time interval $T_{VOLUME,\ Max}$; or resetting $T_{GAP}$ based on the prescribed data amount and/or the number of PDUs being exceeded.

6. The data traffic analyzer of claim 4, wherein the processor is further configured to execute the processor-executable instructions to facilitate the following being performed by the data traffic analyzer:

setting $T_{GAP} = T_{VOLUME,\ Max} + T_{no\ traffic}$.

7. A method, comprising:

measuring, by a data traffic analyzer, data traffic parameters of the data path; and analyzing, by the data traffic analyzer, the measured data traffic parameters of the data path and detecting a bursty traffic pattern based on comparing the measured data traffic parameters to a time interval threshold $T_{Limit}$ which defines gaps between bursty data traffic;

wherein the measured data traffic parameters include:
  i) a data traffic volume and/or a protocol data unit (PDU) count transmitted on the data path; and
  ii) a time point $T_{LPU}$ characterizing the last path usage (LPU) of the data path.

8. The method of claim 7, further comprising:

scheduling, by a scheduler, a first amount of data traffic for transmission via a first type data path and scheduling a second amount of data traffic via a second type data path, wherein access to the second type data path is delayed, which forces the second amount of data traffic to be transmitted via the first type data path;

wherein the data traffic analyzer sends a bursty traffic signal to the scheduler based on detecting bursty traffic behavior; and wherein the scheduler delays access to the second type data path based on the bursty traffic signal.

9. A system, comprising:

a first type data path;

a second type data path;

a data traffic analyzer assigned to the first type data path and configured to detect a bursty data traffic pattern on the first type data path based on traffic parameters of the first type data path; and a scheduler configured to schedule a first amount of data traffic for transmission via the first type data path and to schedule a second amount of data traffic via the second type data path, wherein access to the second type data path is delayed to force the second amount of data traffic to be transmitted via the first type data path;

wherein the data traffic analyzer is configured to send a bursty traffic signal to the scheduler based on detecting a bursty traffic pattern; and wherein the scheduler is configured to delay access to the second type data path based on the bursty traffic signal.

10. The system of claim 9, wherein the scheduler is configured to delay access to the second type data path for a time interval $T_{Delay}$.

11. The system of claim 10, wherein $T_{Delay}$ is a function of the traffic parameters.

12. The system of claim 9, wherein the scheduler is configured to delay access to the second type data path for a time interval $T_{Start\ Delay}$ without requiring the bursty traffic signal, at the beginning of a data transmission.

13. The system of claim 9, wherein the scheduler is configured to delay access to the second type data path until data traffic on the first type data path has exceeded a predefined data volume threshold $V_{Start\ Delay}$ without requiring the bursty traffic signal, at the beginning of a data transmission.

14. The system of claim 9, wherein the scheduler is configured to delay access to the second type data path until a number of protocol data units (PDUs) on the first type data path has exceeded a predefined number of PDUs threshold $PDU_{Start\ Delay}$ without requiring the bursty traffic signal, at the beginning of a data transmission.

* * * * *